United States Patent [19]

Fara

[11] Patent Number: 5,105,702
[45] Date of Patent: Apr. 21, 1992

[54] CUTTING DEVICE FOR THE CABLE STRIPPING MACHINES, MORE PARTICULARLY FOR THE PURPOSE OF A RECOVERY OF THESE CABLES

[75] Inventor: Claude Fara, Veauche, France
[73] Assignee: Addax Sarl, France
[21] Appl. No.: 424,555
[22] Filed: Oct. 20, 1989

[30] Foreign Application Priority Data

Oct. 21, 1988 [FR] France .................. 88 14293

[51] Int. Cl.⁵ .................. H02G 1/12; H01B 15/00
[52] U.S. Cl. .................. 83/425; 81/9.51;
83/433; 83/947
[58] Field of Search ............ 83/425, 431, 435, 436, 83/733, 924, 947, 425.1, 407; 81/9.51

[56] References Cited

U.S. PATENT DOCUMENTS

| | | | |
|---|---|---|---|
| 2,413,192 | 12/1946 | Pope | 83/924 |
| 3,175,430 | 3/1965 | Smith et al. | 81/9.51 |
| 3,724,310 | 4/1973 | Chippendale | 83/435 |
| 4,534,254 | 8/1985 | Budzich et al. | 83/924 |

Primary Examiner—Hien H. Phan
Attorney, Agent, or Firm—Eric P. Schellin

[57] ABSTRACT

Improved cutting device for a wire and cable stripping machine one a supporting frame (2), consisting of a support device (3) for a pair of wheels (5) driving a section of cable (C) to be stripped, a guide assembly (4) for the cable, an adjustment device (12) for positionally controlling a spacing apart of the wheels (5) two contoured, flat and bent and adjustable cutting blades (6) operating along opposite generatrices of the cable and being disposed between the driving wheels to provide a depth of a cut to be made, the cutting blades (6) being adjustable in the vertical plane and in the horizontal plane, each of the cutting blades (6) exhibiting a bent profile and comprises two points of attachment including a first securing point and a second securing point and of articulation and a zone constituting the active cutting part (6.3), the cutting blades comprising a nose-shaped contour (6.6) located in its front part and oriented in a direction of an interior of the bent profile with the active cutting part (6.3), and faces being disposed adjacent the active cutting part (6.3) to form the nose-shaped contour (6.6) that extends rearwardly of the machine.

9 Claims, 4 Drawing Sheets

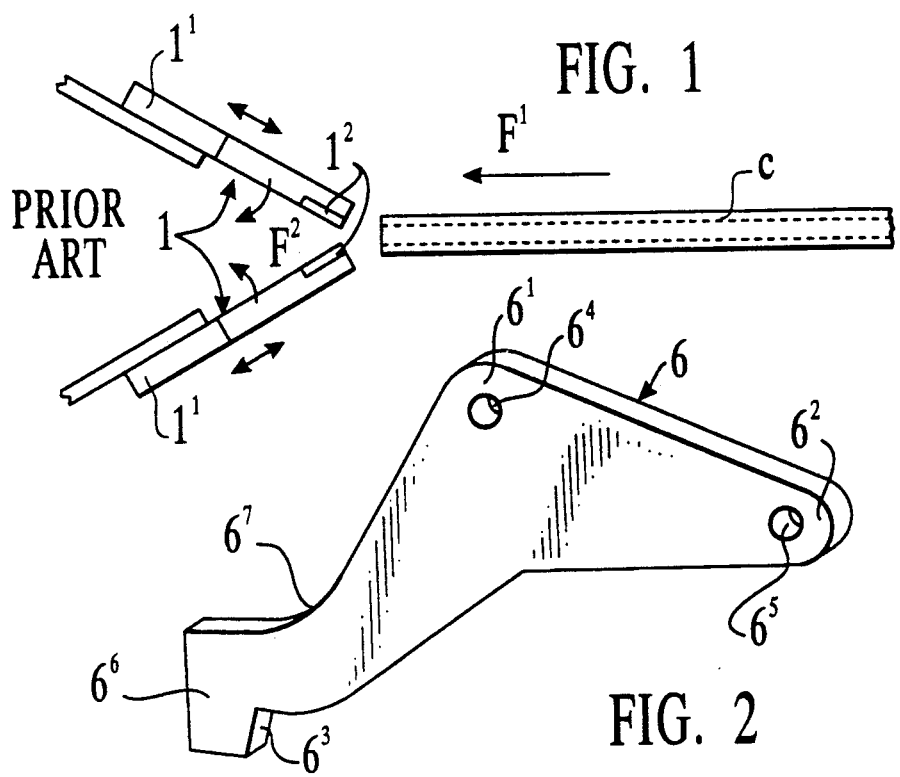
FIG. 1
FIG. 2
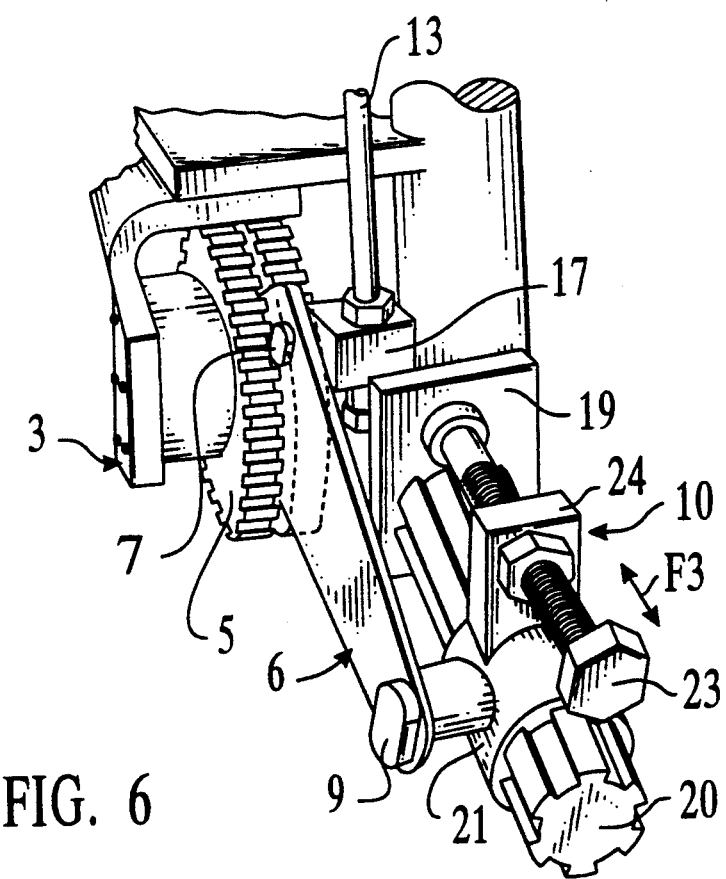
FIG. 6

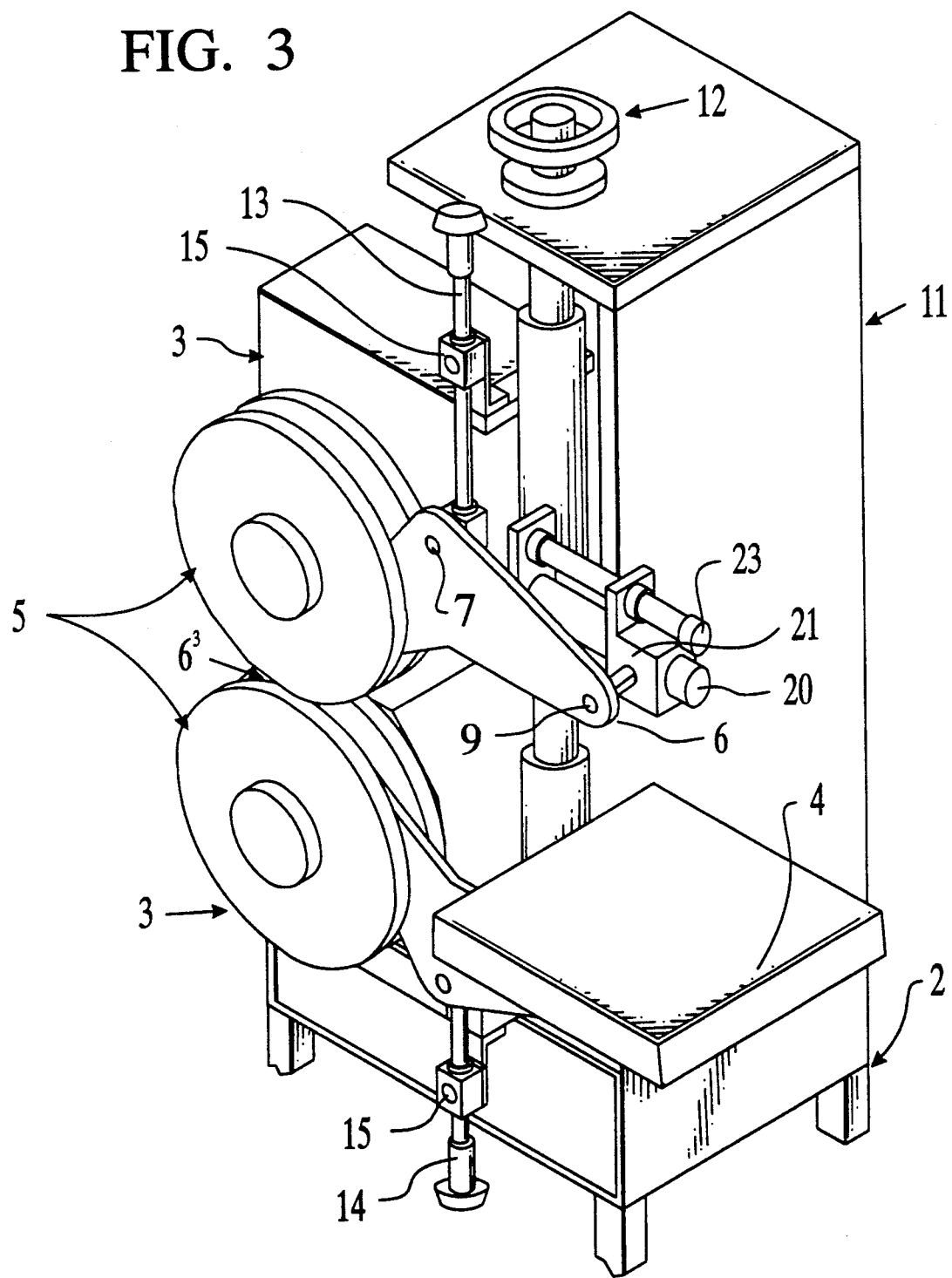

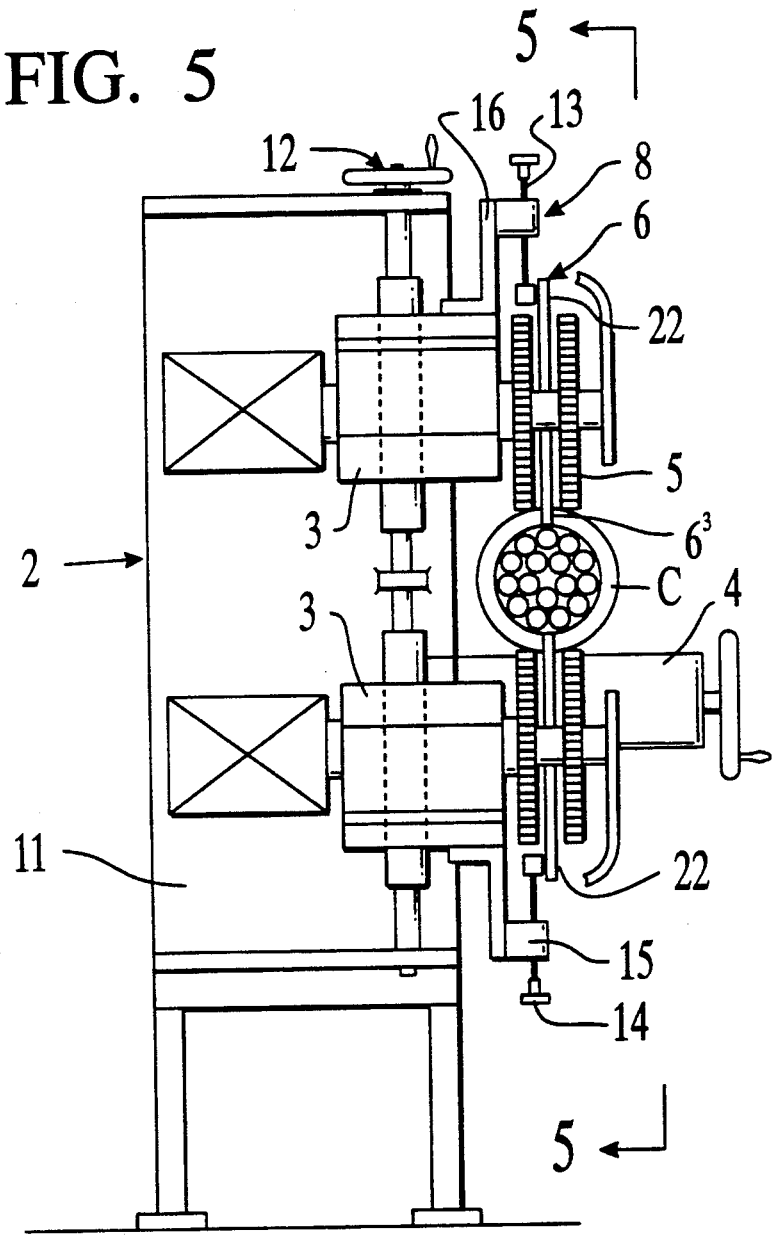

CUTTING DEVICE FOR THE CABLE STRIPPING MACHINES, MORE PARTICULARLY FOR THE PURPOSE OF A RECOVERY OF THESE CABLES

BACKGROUND OF THE INVENTION

1. Field of the Invention

The present invention relates to an improved cutting device for cable stripping machines, and more particularly, the invention relates to improved cutting devices for the purpose of recovery of these cables.

It is apparent that electrical wires such as telephone cables, consist of a plurality of leads, of insulating material, and of various materials for mechanical protection or the sealing of such wires and cables. Some materials used as components for wires and cables have a certain re-saleability, and therefore it is of interest to provide for the recovery of these materials when the wires and cables are discarded as waste. For this purpose, some cable stripping machines have been developed, and, accordingly, these machines of the invention seek to perform a separation in one action or in a plurality of simultaneous actions, the cutting being accomplished at one or more locations of the cross-section of the wire or cable, in order to achieve the stripping thereof.

2. Description of the Prior Art

Various prior art stripping machines and the like are found to be known, and exemplary of the prior art are the following:

French patent 2,346,885
French patent 2,574,225

French patent 2,346,885 includes at least two cutter wheels associated with a driving means so as to be rotated in an opposite direction, in order to drive along the wire or cable clamped between these wheels; the wire or cable is moved thereby between a guide situated ahead of the wheels and a cutting device including a cutting blade situated behind the wheels and intended for slitting the wire or cable. The wheels are mounted within bearings which are so arranged that their center lines remain always parallel to one another, however with the possibility so as to permit their adaption with wires and cables of different sizes or cross-sections. In this way, and in accordance with the possibilities of the scope of the art, either the upper wheel is stationary and the lower wheel is mobile, or the upper wheel is mobile and the lower wheel is stationary. During the machine was operating faultlessly while stripping wires and cables having a cross-section greater than approximately 15 millimeters, the wires and cables of smaller cross-section which constitute a substantial amount of the recovery material, had a tendency to move aside from the cutting plane and slipped under the clamping and driving action of the wheels towards the cutting tool or tools, This was found to be a harmful drawback when used with all the materials existing in the market, and cables having a smaller diameter were not stripped at all, and were accordingly left discarded.

French partent 2,574,225 of the applicant herein shows, as also shown in FIG. 1 below, a device including two sharpened cutting blades 1 disposed on either side of the wire or cable to be stripped. These cutting blades are fixedly mounted by supporting members associated with the bearings of couples of the cable driving wheels, and are movable each one with the corresponding couple of driving wheels, the cutting blades being disposed between the driving wheels. These cutting blades are mounted rearwardly of the machine and in opposition to the threading direction, as indicated by arrow $F^1$ of the wire or cable to be stripped. These cutting blades are in the form of a rearward portion with a yoke-shaped contour $1^1$ extending as a flattened contour $1^2$ in an endwise orientation showing the active part of the tool.

These cutting devices of the prior art have many or several drawbacks over the present invention, more particularly when wires and cables of small cross-section are to be stripped. Firstly, it is a result of the feeding action of the cable toward the cutting area, the cutting blades have a tendency to be pivoted axially and to come closer to one another, in accordance with arrow $F^2$ for entering more deeply into the core of the cable and which tends to slow down the advancement of the cable. Moreover, as the cable portion stripped from insulating material is discharged through the rear side of the machine, this portion has a tendency to be rolled up about itself and to come into abutment against the bottom of each cutting blade where jammings are caused by an accumulation of material. It is therefore necessary to intervene, and to provide for periodical control and maintenance; when these precautions are omitted, the operations of the machine could become faulty, as the covering of the stripped wire or cable is not removed, or is seen as insufficiently removed. Moreover, as as shown in the drawings below, the contouring of the cutting blades is particularly expensive as far as concerning providing for an embodiment and construction of these machines of the prior art, since these cutting blades have a small length and the access thereof is difficult.

These patents or known prior uses teach and disclose various types of cable strippers and the like, but none of them taken singly or in combination disclose the specific details of the combination of the invention in such a way as to bear upon the claims of the present invention.

SUMMARY OF THE INVENTION

It is therefore an object of the invention to eliminate these several drawbacks and to solve the problems which arise therein.

It is another object of the invention to provide a simple, inexpensive cable cutting device and a solution which offers a novel construction for cutting tools and their mounting arrangements in a cutting device for cable stripping machines and for the recovery of cables and wires.

In accordance with another object of the invention, there is provided a device that includes two contoured and flat-bent cutting blades having substantial lengths and located ahead of the machine, so the cutting area of these blades act in a threading direction of the cable, the cutting blades being forcedly spaced apart mechanically or by the operator as described below when the cable is being threaded along and these blades being associated with means for vertical adjustment and means for adjustment within a horizontal plane.

Other objects and many advantages of this invention will be readily appreciated and clearly apparent as the same becomes better understood by reference to the following detailed description when considered in connection with the accompanying and attached drawings.

DESCRIPTION OF THE SEVERAL VIEWS OF THE DRAWINGS

FIG. 1 is a diagrammatic plan view of a cutting device of the prior art and which has been referred to above.

FIG. 2 is a perspective view of a cutting blade in accordance with a preferred embodiment and best mode of the present invention.

FIG. 3 is a perspective view of a diagrammatical character of the stripping machine in accordance with the invention.

FIG. 5 is a sectional view taken along line IV—IV of FIG. 4.

FIG. 6 is a partial perspective view of the means for the adjustment of the horizontal position of the cutting blades.

Figure 4:
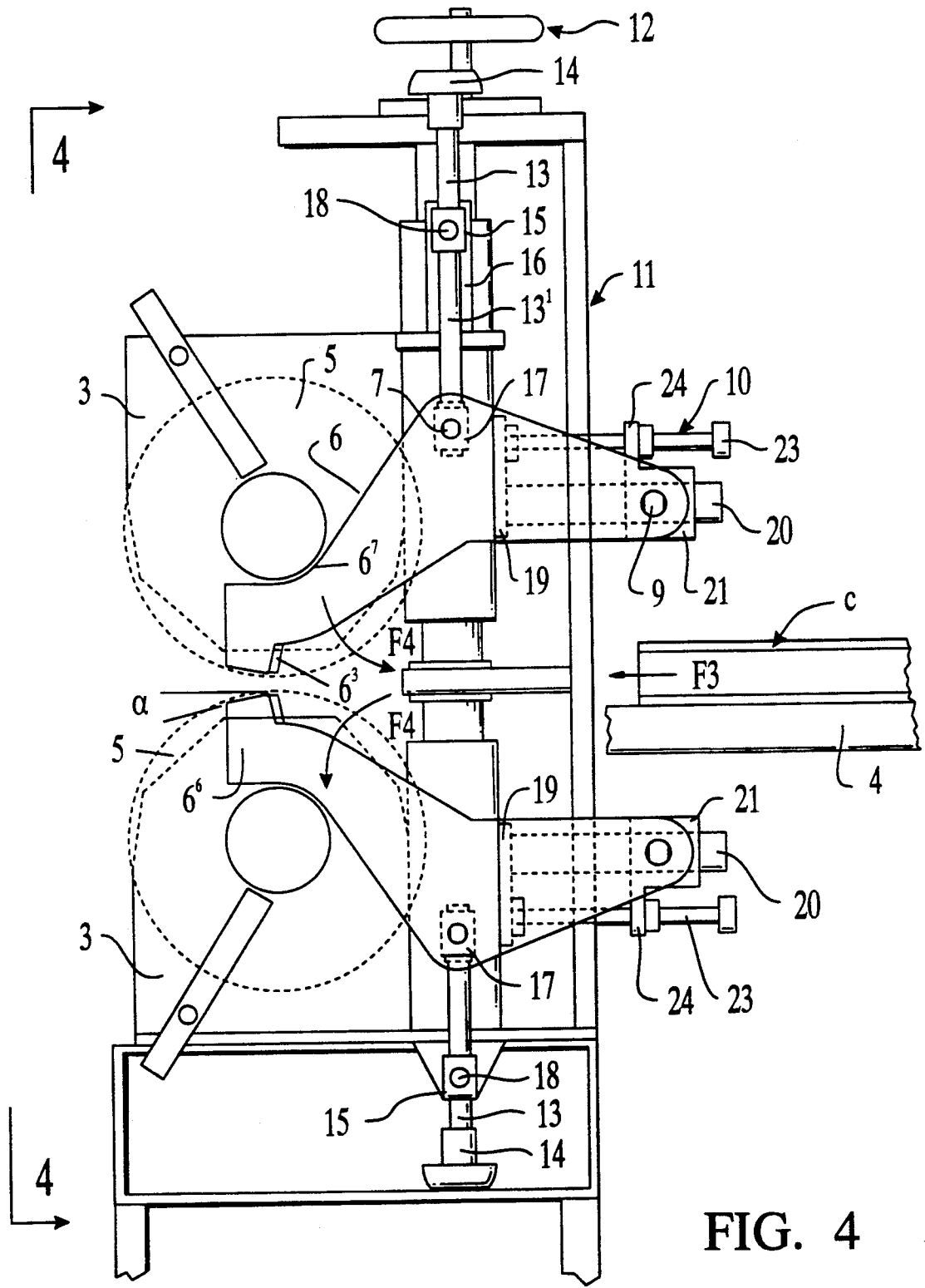
FIG. 4 is a longitudinal sectional view taken along line V—V of FIG. 5.

In order to provide the object of the invention more concretely, the invention will be described in a non-limiting manner with reference to the examples of the embodiment(s) shown in the Figures of the drawings.

DESCRIPTION OF A PREFERRED EMBODIMENT OF THE INVENTION

The stripping machine of FIGS. 2-6 includes a contoured supporting frame 2 for mounting the supporting means 3 of the pair of driving wheels 5 for the wire or Cable C to be pulled therealong, the guide means 4 of the wire or cable towards the cutting area, the adjustment means 12 for spacing apart positionally the driving wheels 5 in accordance with the size or cross-section of the wire or cable to be stripped by the motive means for the operation of the machine.

The two cable driving wheels are disposed for action on either side of the driven wire or cable. The means for the previous guiding of the wire or cable towards the cutting area can be a V-shaped slideway, or as in the example which has been depicted in a non-limiting manner, the guide means can be a vice secured to supporting base plate of the frame and the vice can be provided with removable jaws.

According to the invention there has been developed a particular cutting device which is comprised of two identical contoured cutting blades 6 having a substantial length and capable of being engaged each one within the space defined between the wheels of the same couple of wheels, the cutting blades 6 being disposed ahead of the machine and the action of their cutting area being exerted in the threading direction of the wire or cable, as indicated by arrow $F^3$, so that there will be no excessive penetration of these blades into the cover of the cable to be stripped, and that there will be a possible tendency to a spacing apart of these cutting blades, as indicated by arrow $F^4$, while a correct cutting operation will be provided al the same in accordance with two opposing generatrices.

According to an important characteristic of the invention, the cutting blades are made of sheet iron having been subjected to suitable heat treatments for imparting stiffness and hardness to the sheet iron, more particularly in the cutting area. The cutting blades have a flat section which is uniform; they have a bent contour with two securing and connecting points $6^1$-$6^2$ for positional adjustment, and they have also an area which constitutes an active cutting part $6^3$. Specifically, each cutting blade is provided in the central portion thereof corresponding to the bending area with an opening $6^4$ for the positioning of a connecting bolt 7 associated with vertical adjustment means 8 for the cutting blade, which is provided in the rearward portion thereof with a rear opening $6^5$ for the positioning of a connecting bolt 9 associated with adjustment means 10 for the horizontal position of the cutting blade. Each of the blades 6 has in front a nose-shaped contour $6^6$ turned in the direction of the inside of the bent contour and constituting the active cutting part proper. Between the opposite faces of the nose forming active parts of the cutting blades, a relief angle having a convenient amount $\partial$ opens in the direction of the rearward portion of the machine, towards the side where the stripped wires and cables are discharged.

The active part of the cutting blade can be sharpened and taking into account the width of the nose-shaped portion, it is possible to have available a potential cutting area of several millimeters providing thereby, after the necessary sharpening, a capacity of use of the cutting blades which is increased relative to the well-known cutting blades of the prior art. Finally, the cutting blade has a clearance contour $6^7$ to bypass the rotational axis of the driving wheels. Advantageously, the cutting plane defined by the active parts of the cutting blades is situated within the vertical diametrical axis of the wheels for driving the wire or cable to be stripped.

It is necessary now to examine more fully the means for the positional adjustment of the cutting blades 6 concerning both the spacing apart of these blades in accordance with the size of cross-section of the cable or wire to be stripped and the position of the blades 6 in accordance with the degree of tear and wear of the active cutting area.

The supporting frame 2 which forms a seating includes a vertical base 11 with horizontal abutting planes which receive in a conventional manner the built-in means 12 of the driving wheels for presetting of the position thereof in dependence on the size of cross-section of the wire or cable to be stripped. For the positioning of the upper and lower cutting blades 6, as the mounting is the same for the upper cutting blade and the lower cutting blade, there is provided a connection and control screw 13 which is manipulated by a handwheel 14, the screw 13 being guided within a chuck 15 made easy by means of a floating mounting with a contoured lug 16 formed on the supporting base 11. The end $13^1$ of the screw is associated with a block 17 which is in turn mounted fixedly on the connecting bolt 7 inserted within the opening $6^4$ of the cutting blade. The floating mounting disposed between the sleeve or chuck 15 and the contoured lug 19 is obtained with the aid of a journal 18 or equivalent means, thus in order to provide an slight angular variation of the positioning of the manipulating screw, when the cutting blade 6 is shifted horizontally by the second adjustment means in dependence upon the degree of wear and tear of the active part of the cutting blade 6.

Therefore, the second adjustment means is constructed as follows. A contoured supporting lug 19 is disposed within a lateral plane starting from the base of the abutment. A grooved shaft 20 in a fixed position, situated within a plane parallel to the plane of the cutting blade, is received in the lug 19 rearwardly of the cutting blade. A slidable sleeve 21 is received by this grooved shaft 20. The connecting bolt 9 inserted and secured within the rear opening $6^5$ formed on the cutting blade is received laterally by the sleeve. Nuts 22 are mounted at the end of the bolt 23 and also on the bolt 7 to permit the cutting blade to be taken down.

Moreover, the connecting bolt 23 mounted fixedly and rotated about itself is received by the contoured supporting lug 19 in the upper portion thereof and within a plane above the grooved shaft 20, the connecting bolt 23 being guided and maintained horizontally by a plate 24 disposed vertically from the sleeve 21 onwards. It will be thus appreciated that by actuating the connecting bolt 23, it is possible to cause a positional shifting of the side sleeve 21, which is freely movable only in accordance with the grooved shaft 20, permitting the cutting blade 6 to be moved forwardly or rearwardly. Therefore, when it is necessary for the active portion of the cutting blade 6 to be resharpened, there is no difficulty to be met with by the operator in clearing and making free the cutting blades 6 after the removal of the interlocking means 23. After having been sharpened, the cutting blades 6 are positioned again. It is possible then for the operator, by means of the adjustment of the connecting bolt 23 to set the position correctly by moving the cutting blades 6 rearwardly relative to the former position thereof, so that the active part of the cutting blade will be situated within the axis of the pair of driving wheels 5.

The positional adjustment of the cutting blades 6 after they have been sharpened originates a slight backward shifting in order to allow for the best conditions of cutting. It is therefore necessary, relative to the first vertical adjustment member for the cutting blades 6, i.e., relative to the depth of the cut, to provide a floating mounting for the adjustment member of the cutting blades 6 as stated hereinbefore.

The mounting for the adjustment member of the upper cutting blades 6 has been described; similar apparatus are used for the lower cutting blades 6 and the supporting elements are disposed in connection with the lower part of the frame and of the base.

Advantages of the invention result clearly from the description and the following advantages are to be pointed out more particularly:

the novel construction of the cutting blades 6, the manufacture of which is simple as well concerning the material and the shape of which the cutting blades 6 are made; the cutting blades 6 can be made by a simple stamping operation with the same template for the upper cutting blade and the lower cutting blade;

the mounting of each cutting blade is easy and the sharpening is readily performed;

each cutting blade, owing to the shape thereof, has a greater duration and is neither expensive nor difficult to change over a cutting blade 6, if necessary; as a result of the bent contour and of the substantial length, the stiffness is increased and is a source of reliability;

the different positioning of the cutting blades 6 as compared with the prior art, makes the machine more efficient and prevents andy jamming when stripped wire or cable and the cover thereof are discharged.

The foregoing advantages of this invention are in its simplicity and effectiveness as a cutting device for cable stripping machines and for the recovery of cables and wires, which eliminates the complexity, weight and inefficiency of mechanical devices currently used for these purposes. Other advantages will be apparent to those skilled in the art in view of the above teachings.

Obviously, many modifications and variations of the present invention are possible in light of the above teachings. It is therefore to be understood that within the scope of the appended claims the invention may be practiced otherwise than as specifically described.

I claim:

1. Improved cutting device for a wire and cable stripping machine on a supporting frame (2), comprising supporting means (3) for a pair of wheels (5) driving a section of cable (C) to be stripped, guide means (4) for the cable, adjustment means (12) for positionally controlling a spacing apart of the wheels (5) in accordance with and as a function of the section of the cable to be stripped, two contoured, flat and bent cutting blades (6) operating along opposite generatrices of the cable and being disposed between the wheels to provide a depth of a cut to be made, means for controlling positioning of the cutting blades as a function of the depth of the cut to be made, each of the cutting blades (6) having a cutting area and being of a substantial length and being positionably disposed in front of the machine, the cutting blades having the cutting area including an active cutting part (6.3) in a threading direction of the cable, the cutting blades (6) being spaced apart when the cable is being threaded and caused to separate one from the other at the passage of the cable, the cutting blades (6) being associated with vertical adjustment means for control of position in the vertical plane and with horizontal adjustment means for control of position in the horizontal plane, each of the cutting blades (6) exhibiting a bent profile and comprises two points, including first and second securing points, of attachment and of articulation and a zone constituting the active cutting part (6.3), the cutting blades comprising a nose-shaped contour (6.6) located in its front part and oriented in a direction of an interior of the bent profile with the active cutting part (6.3), and faces being disposed adjacent the active cutting part (6.3) to form the nose-shaped contour that extends rearwardly of the machine, the first securing point (2.1) of attachment of each of the cutting blades being situated in a central portion corresponding to the bent profile and including an opening (6.4) for positioning of a connecting means (7) associated with the pair wheels (5) for the cutting blades, and the second securing point of attachment being situated in a rearward portion of the cutting blades and includes an opening (6.5) for positioning of a connecting means (9) associated with the horizontal adjustment means (10) for horizontal positioning the cutting blades.

2. Cutting device as claimed in claim 1 wherein each of the cutting blades has in a front portion thereof the nose-shaped contour (6.6) turned in the direction of an inside of the bent profile with the active cutting part, and opposite faces of the nose-shaped contour forming active parts defining therebetween a relief angle which opens in a direction of a rearward portion of the machine.

3. Cutting device as claimed in claim 2 wherein each of the cutting blades includes a clearance contour (6.7) for by-passing a rotational shaft of the cable driving wheels.

4. Cutting device as claimed in claim 1 wherein
the vertical adjustment means for each of the cutting blades (6) includes a control screw (13) capable of being manipulated with the aide of a hand control means (14),
the screw is guided within a sleeve (15) which is made fast through a floating mounting with a lug (16) integral with the structure of the frame, and
the end (13.1) of the screw is associated through a means (17) with connecting means (7) for the securing the cutting blades (6).

5. Cutting device as claimed in claim 4 wherein
the floating mounting between the sleeve (15) and the lug (16) associated with the structure of the frame is obtained with the aid of a means (18) permitting a slight angular variation of the position of the manipulating screw in accordance with the adjustment of the horizontal position of at least one of the cutting blades.

6. Cutting device as claimed in claim 4 wherein
the connecting means (7) and a connecting bolt (9) for the connection of the cutting blades with the vertical adjustment means and the horizontal adjustment means accommodate an arresting and interlocking means for removal of the cutting blades.

7. Cutting device as claimed in claim 1 wherein
the means for the horizontal adjustment of each of the cutting blades are comprised of a contoured supporting lug (19) receiving in the lower portion thereof a means (20) for guiding in translation a sleeve (21) disposed within a plane parallel to a plane of the cutting blades,
the guide means being associated with the cutting blades through a connecting means (9),
the lug (19) received in the upper portion thereof a connection and control screw (23) which is parallel to the guide means (20) and is held in position by a plate (24) associated with the sleeve (21), and
the screw is actuated for providing shifting of the sleeve (21) on the guide means (20) as well as shifting of the cutting blades (6) which is associated therewith.

8. Cutting device as claimed in claim 7 wherein the guide means (20) is a shaft that is selectively keyed, splined or grooved.

9. Cutting device as claimed in claim 1 wherein
the upper cutting blades and the lower cutting blades are controlled respectively by the vertical adjustment means and the horizontal adjustment means.

* * * * *